US010703062B2

(12) United States Patent
Oertig et al.

(10) Patent No.: US 10,703,062 B2
(45) Date of Patent: Jul. 7, 2020

(54) SCREW PRESS FOR COMPRESSING AND DEWATERING A SUSPENSION

(71) Applicant: HITACHI ZOSEN INOVA AG, Zürich (CH)

(72) Inventors: Michael Oertig, Frauenfeld (CH); Patrik Daniel Gsponer, Oberuzwil (CH); Daniel Schmidt, Oberuzwil (CH)

(73) Assignee: HITACHI ZOSEN INOVA AG, Zurich (CH)

( * ) Notice: Subject to any disclaimer, the term of this patent is extended or adjusted under 35 U.S.C. 154(b) by 737 days.

(21) Appl. No.: 15/315,792

(22) PCT Filed: Jun. 10, 2015

(86) PCT No.: PCT/EP2015/062937
§ 371 (c)(1),
(2) Date: Dec. 2, 2016

(87) PCT Pub. No.: WO2015/189271
PCT Pub. Date: Dec. 17, 2015

(65) Prior Publication Data
US 2017/0087788 A1   Mar. 30, 2017

(30) Foreign Application Priority Data
Jun. 11, 2014  (CH) .......................... 881/14

(51) Int. Cl.
*B30B 9/12* (2006.01)
*B30B 9/26* (2006.01)
*B30B 9/14* (2006.01)

(52) U.S. Cl.
CPC ............ *B30B 9/128* (2013.01); *B30B 9/12* (2013.01); *B30B 9/26* (2013.01); *B30B 9/14* (2013.01)

(58) Field of Classification Search
CPC .... B30B 9/02; B30B 9/12; B30B 9/18; B30B 9/121; B30B 9/125; B30B 9/128; B30B 9/26; B30B 9/267
See application file for complete search history.

(56) References Cited

U.S. PATENT DOCUMENTS

| 1,709,349 A | 4/1929 | Hollstein |
| 2,109,398 A * | 2/1938 | McNitt ................. B30B 9/12 |
| | | 100/148 |

(Continued)

FOREIGN PATENT DOCUMENTS

| CN | 101503004 A | 8/2009 |
| DE | 19944110 A1 | 3/2001 |

(Continued)

OTHER PUBLICATIONS

Machine Translation of JP 2005-177729, Translated May 7, 2019, 7 Pages. (Year: 2005).*

(Continued)

*Primary Examiner* — Gregory D Swiatocha
(74) *Attorney, Agent, or Firm* — Oliff PLC

(57) ABSTRACT

A screw press includes a press chamber in which a screw shaft is mounted such that the screw shaft is surrounded by a screen jacket and is rotatable about a screw shaft axis. The screen jacket is fastened to a screen jacket holding device including at least one beam running through the press chamber. The screen jacket is formed of a plurality of multipart screen baskets configured to receive a plurality of screen basket inserts, each multipart screen basket of the plurality of multipart screen baskets includes a semi-cylindrical first screen basket half shell and a semi-cylindrical second screen basket half shell. At least one pivot hinge is disposed between the first screen basket half shell and the second screen basket half shell. A basket lug is disposed on (Continued)

the first screen basket half shell and the second screen basket half shell.

8 Claims, 3 Drawing Sheets

(56) References Cited

U.S. PATENT DOCUMENTS

| | | | | |
|---|---|---|---|---|
| 2,421,763 A * | 6/1947 | Simon | ................ | B30B 9/26 |
| | | | | 100/129 |
| 4,266,473 A * | 5/1981 | Hunt | ................ | B30B 9/12 |
| | | | | 100/117 |
| 4,279,197 A * | 7/1981 | Hunt | ................ | B30B 9/12 |
| | | | | 100/117 |
| 4,291,619 A * | 9/1981 | Hunt | ................ | B30B 9/12 |
| | | | | 100/43 |
| 4,323,007 A * | 4/1982 | Hunt | ................ | B30B 9/12 |
| | | | | 100/117 |
| 4,397,230 A * | 8/1983 | Hunt | ................ | B30B 9/12 |
| | | | | 100/117 |
| 2009/0218279 A1 * | 9/2009 | Eichler | ................ | B03D 1/02 |
| | | | | 210/603 |

FOREIGN PATENT DOCUMENTS

| | | | | |
|---|---|---|---|---|
| EP | 2561981 A2 | | 2/2013 | |
| JP | S58-501111 A | | 7/1983 | |
| JP | 2005-177729 A | | 7/2005 | |
| JP | 2005177729 A | * | 7/2005 | ............ B30B 9/128 |
| JP | 2006-224090 A | | 8/2006 | |
| WO | 83/00306 A1 | | 2/1983 | |
| WO | 2006/111110 A1 | | 10/2006 | |
| WO | 2013/030638 A1 | | 3/2013 | |

OTHER PUBLICATIONS

Aug. 20, 2015 International Search Report issued in International Patent Application No. PCT/EP2015/062937.

Dec. 15, 2016 International Preliminary Report on Patentability issued in International Patent Application No. PCT/EP2015/062937.

* cited by examiner

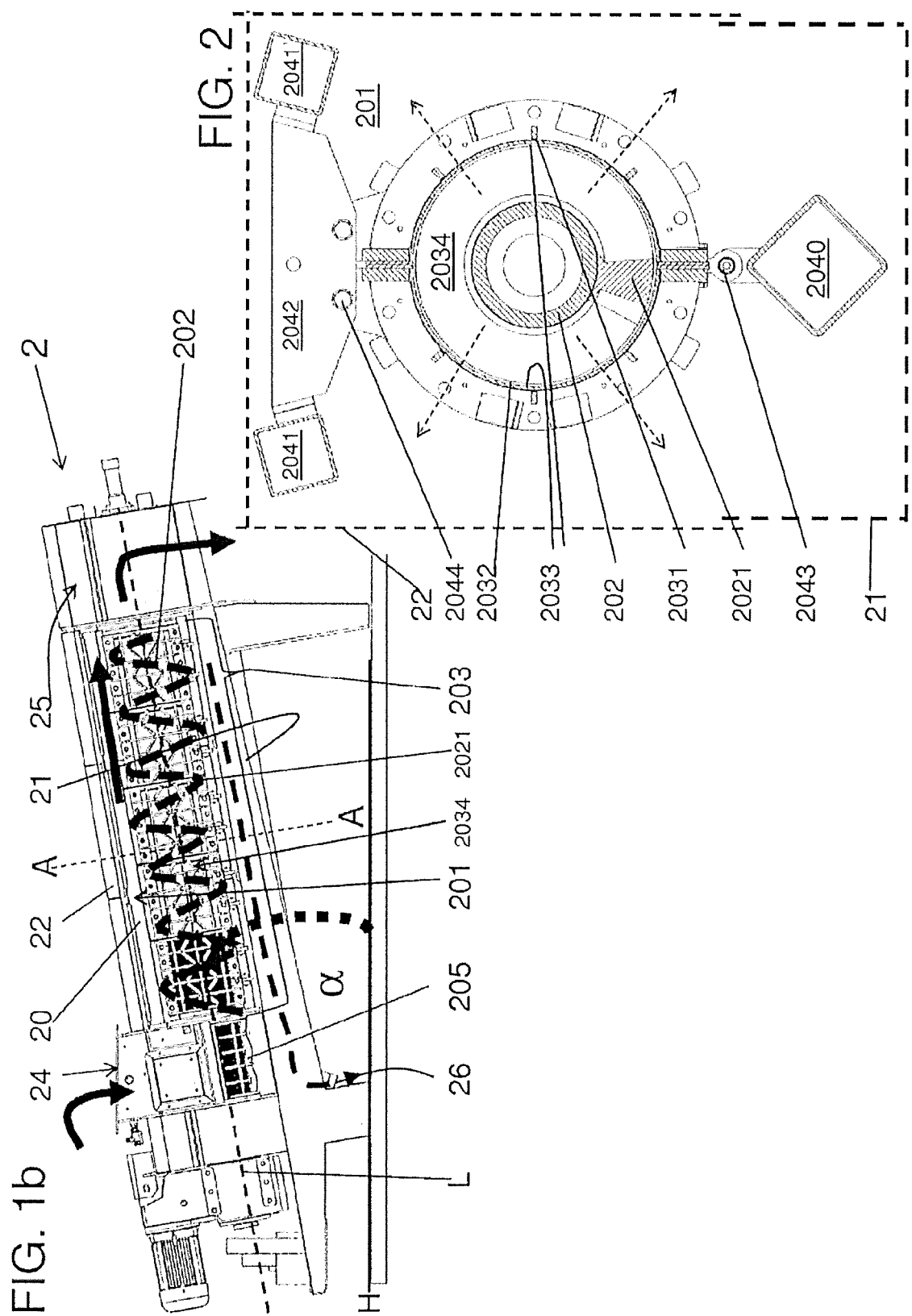

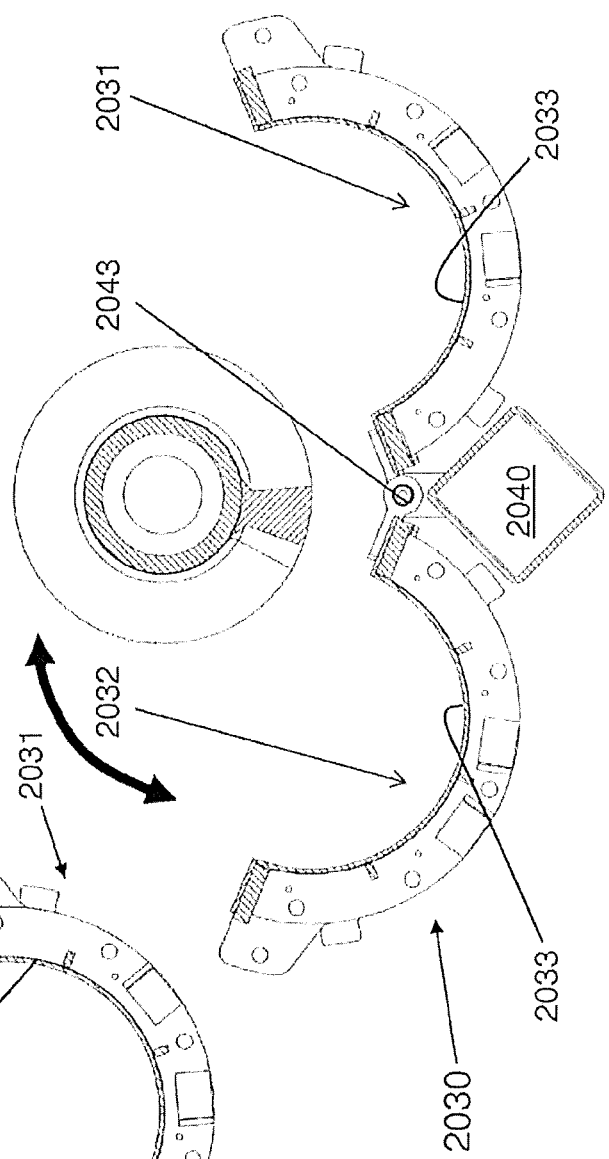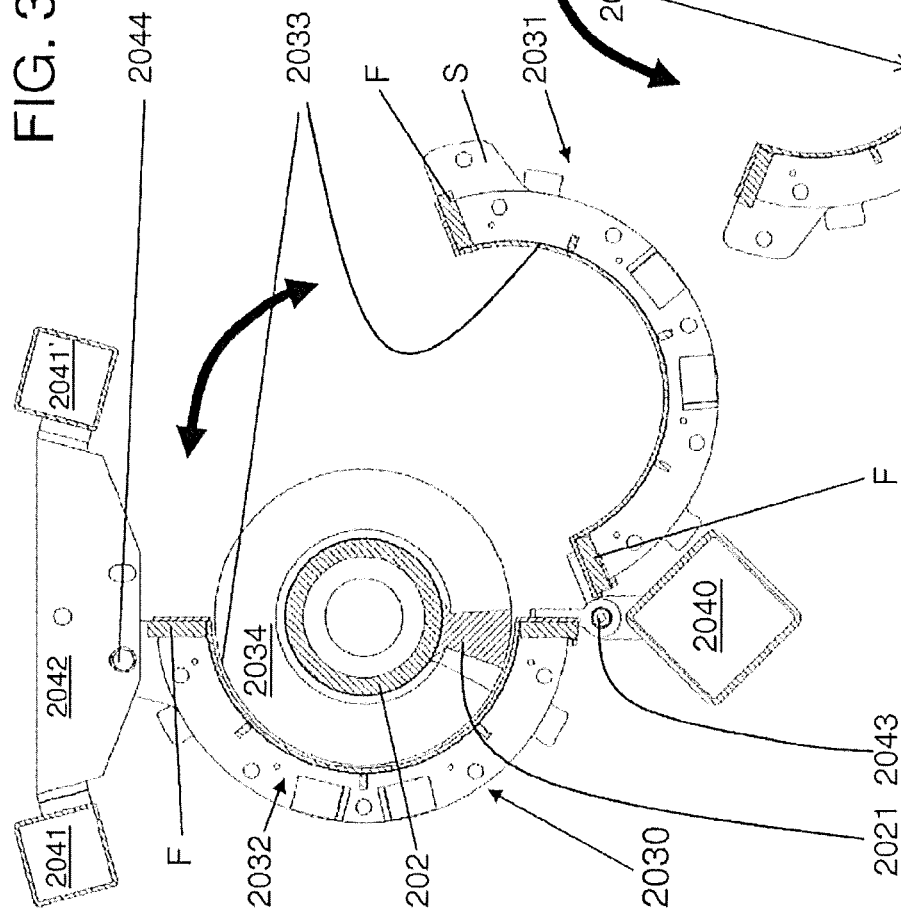

SCREW PRESS FOR COMPRESSING AND DEWATERING A SUSPENSION

TECHNICAL FIELD

The present invention describes a screw press, usable as a dewatering device, for compressing and dewatering a suspension, comprising a press chamber, in which a screw shaft is mounted in such a way that it is surrounded by a screen jacket and is rotatable about a screw shaft axis, wherein the screen jacket is fastened, held within the press chamber, to a screen jacket holding device and the screen jacket is formed of a plurality of multipart screen baskets with screen basket inserts insertable therein, a biogas plant comprising a screw press, and a maintenance process for the changing of screen basket inserts from screen baskets, in a press chamber of a screw press used as part of a dewatering device for the dewatering of suspensions.

PRIOR ART

In the production of biogas in fermenters or fermentation plants is formed a suspension, more accurately a digestate suspension, which should be dewatered in order to improve the biogas yield, shorten the post-digestion process and reduce the odor emission. Due to the typical consistency of digestate suspension, which consists of around ⅔ liquid and ⅓ dry substance, dewatering devices comprising a screw press are usually used. From the fermenter, the digestate suspension is transferred into the screw press and is there mechanically digested and dewatered.

As described in DE 199 44 110 A1, the screw press of a dewatering device comprises a press chamber, in which a screen jacket surrounding a screw shaft is mounted. After pouring of the digestate suspension through a press infeed into the press chamber, the principle of crossflow filtration is utilized within the screw press, wherein a screw shaft rotating within the pressuretight, liquid-permeable screen jacket transports the digestate suspension in the direction of the screw shaft axis, wherein, as a result of the built-up pressure within the screen jacket, a liquid or pasty filtrate is pressed out through the perforations of the screen jacket. As a result of the friction of the solid matter of the digestate suspension on the screen jacket and of the screw shaft, a throttling of the material discharge is achievable, so that a counterpressure which conveys the filtrate or press water through the openings in the screen jacket is built up. Solids of the thus dewatered digestate are retained by the screen jacket, which is usually formed of screen baskets, and are ultimately conveyed to a press material outfeed and there transported out of the screen jacket or screw press.

Screw presses of this type are usually run at low speeds of just a few revolutions per minute, wherein, in the case of a continuous permanent operation, low operating and maintenance costs are incurred, while reusable dewatered digestate and filtrate continuously accrue from the press material outfeed or a filtrate outlet.

In order that screw presses of this type function in a trouble-free manner, the structure has to be adapted to the expected digestate suspension. A suitable screen jacket must be configured with a suitable size of openings, the screw shaft must be operated at suitable rotation speed, and the clearance between the inner face of the screen baskets and the periphery of the screw shaft must be suitably chosen.

In continuous operation of a screw press for dewatering digestate suspensions, it has been shown that the screen jacket or the screens are automatically exposed during running operation, in that solids are led past the screen areas. The screens wear relatively quickly, however, and have to be changed. According to the prior art, the exchange of screen inlays of the screen jacket is associated with high technical complexity. For this, the screen baskets are completely removed, new screen inlays are introduced and the screen baskets are reinstalled.

While the pressing characteristics and throughput of the employed screw presses have been optimized for the dewatering of digestate suspensions, the maintenance of such screw presses is still problematical.

From EP 2 561 981 A2 derives a dewatering device comprising a screw press which has a press chamber with a screen jacket, comprising a plurality of screen baskets formed as screen basket half shells. The press chamber is supported by a press chamber holding device, which stands on a supporting device on the floor. In the operating state, the screen baskets fully surround the screw shaft, whereby a filtration space is formed. The screen baskets are fastened to two horizontally lying beams as a screen jacket holding device, such that they run parallel to the screw shaft axis. At least the upper screen baskets are designed to be removable from the beams, so that, once the upper screen baskets are removed, the filtration space and the screw shaft become accessible. Following disassembly of the upper half of the screen baskets, the screen baskets are deposited on the floor and worn screen inlays can be exchanged. For this, new screen inlays are inserted into the screen basket half shells and fastened. Those halves of the screen baskets which have remained in the press chamber can be provided with new screen inlays once the screw shaft is removed from the press chamber. Only when the lower screen basket half shells are exposed can the associated screen inlays also be changed. Although, according to EP 2 561 981 A2, individual worn screen inlays can be exchanged, the maintenance is associated with high technical complexity. The disassembly of the screen jacket has hitherto been complex, since the screw shaft must be removed in order that access can be gained to all the screen baskets.

In known screw presses of this kind, the serviceability or flexibility of maintenance is very limited. Since the accessibility of the screen jacket is made more difficult, a complex disassembly of many components must take place in order to change worn screen inlays. Often the manufacturer must carry out the periodic maintenance through a member of staff in order to ensure, for instance, the correct reinstallation of the screw shaft.

In U.S. Pat. Nos. 4,397,230 and 4,279,197 are disclosed, by contrast, screw presses in which the screen basket half shells are mounted pivotably via a hinge. This enables a simpler and more rapid maintenance of the screw press and facilitates, in particular, the exchange of screen inlays.

REPRESENTATION OF THE INVENTION

The present invention has set itself the object of providing a dewatering device comprising a screw press and a screw press comprising a screen jacket, which screw press allows not only a simple and rapid maintenance thereof, but at the same time also has a lowest possible wear which is as even as possible.

Necessary periodic services of the screw press are facilitated, since only a small number of maneuvers are necessary, whereby the time expenditure for the maintenance is shortened enormously. The maintenance does not necessarily have to be carried out by a trained maintenance worker of the manufacturer, whereby a flexible and inexpensive maintenance is enabled.

In the development process, particular value was placed upon an uncomplicated changing of wearing parts such as screen inlays, so that suitable screen inlays can be flexibly and rapidly replaced or provided according to requirement.

In addition, as a result of the additional fastening of the screen basket half shells to a bracket of the screen jacket holding device, the stability of the construction is also improved and, in particular, also a very concentric running is achieved. This has the result that fewer forces act on the worm gearing and the screen basket inserts, which leads to lower wear and tear and thus a greater working life.

Moreover, in the screw press according to the invention, the wear takes place concentrically and evenly, so that all parts are roughly equally heavily worn and therefore have to be replaced or serviced at approximately the same time. This leads to a less frequent maintenance requirement and thus, all in all, to a lesser complexity and shorter downtimes. The otherwise customary wearing shells also thereby become unnecessary.

The above effects are of great benefit, in particular in longer screw presses, where often a plurality of a screen baskets are arranged one behind another. In shorter screw presses, such as are disclosed, for instance, in U.S. Pat. Nos. 4,397,230 or 4,279,197, this is of lesser importance.

BRIEF DESCRIPTION OF THE DRAWINGS

A preferred illustrative embodiment of the subject of the invention is described below in connection with the accompanying drawings.

FIG. 1a shows a perspective view of a dewatering device for a biogas plant comprising a screw press, while FIG. 1b shows a side view of the screw press from FIG. 1a, wherein a cover hood is partially removed and thus a view of a screen jacket is enabled.

FIG. 2 shows a sectional view along the line A-A from FIG. 1b with indicated complete press chamber and drain pan with closed screen jacket, while FIG. 3 shows a screen jacket which is open on one side, with swung open first screen basket half shell, in a sectional view, and FIG. 4 shows a fully opened screen jacket, with first and second screen basket half shell swung open on both sides, in a sectional view, wherein a part of a screen jacket holding device and the screw shaft have been omitted.

DESCRIPTION

Figure 1A:
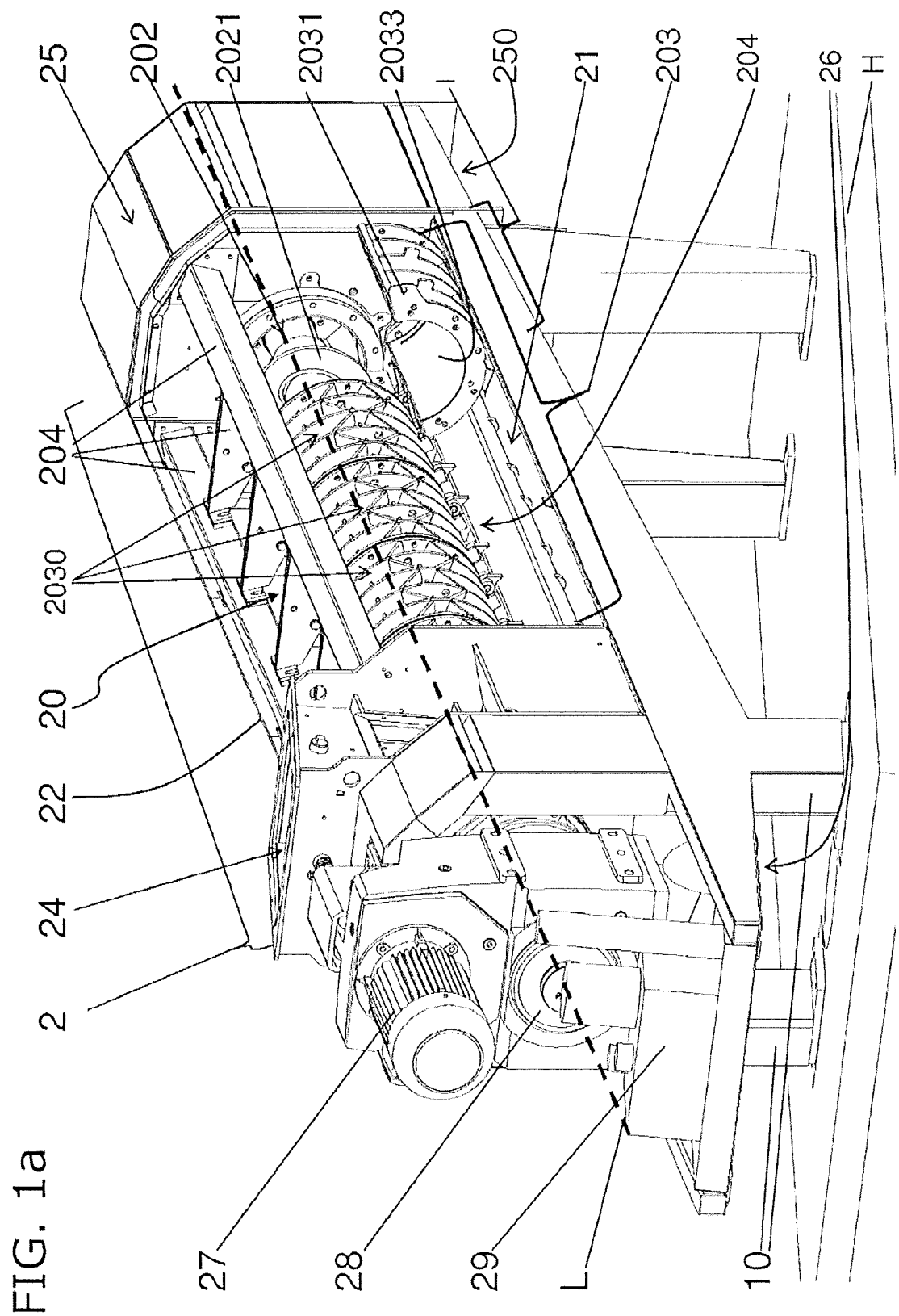

A dewatering device for integration in a fermentation plant or biogas plant, or as part thereof, is represented in perspective view in FIG. 1a. The dewatering device is designed as a screw press 2. The screw press 2 corresponds to a possible structure in order to dewater a digestate suspension which accrues in a wet or dry fermentation plant. Digestate suspensions of this type consist of around ⅔ liquid and ⅓ dry substance. As a result of a dewatering, on the one hand the filtrate or press water formed from the liquid and, on the other hand, the dewatered digestate in the form of a pressed cake can be reused in an optimized manner. The dewatering device is mounted on press supports 10 such that it runs at an angle to the horizontal H.

The screw press 2 has a press chamber 20, in which a screw shaft 202 is arranged traversing the press chamber 20. The screw shaft 202 runs along a screw shaft axis L and has a screw shaft helix 2021. The screw shaft 202 is held by two shaft bearings (not represented here). The screw shaft 202 runs from a fill region, in which a press material infeed 24 is disposed, to an outfeed region, in which a pressing head 25 with a press material outfeed 250 is disposed.

The press chamber 20 is shaped such that it can be covered by a cover hood 22. In FIG. 1a is represented a multipart removable cover hood 22, wherein only the away-facing part of the cover hood 22 has been left partially covering the press chamber 20 in order that a view into the press chamber 20 is possible. The cover hood 22 is here of three-part construction. The floor-facing part of the press chamber 20 is designed as a continuous drain pan 21, so that pressed-out filtrate can make its way into drain pan 21 and can flow, on the basis of gravity, to a filtrate outlet 26 indicated in FIG. 1a.

The screw shaft 202 is driven by a motor 27, a slip-on gear mechanism 28 and a hydraulic power unit 29, controlled by a control system (not represented). Depending on the consistency of the digestate suspension and the dewatering to be achieved, the rotation speed of the screw shaft 202 and the acting torques are adjusted by the control system. The screw shaft 202 is here generally operated at no more than just a few revolutions per minute.

In the press chamber 20, a screen jacket 203 concentrically surrounds the screw shaft 202. The screen jacket 203 comprises a plurality of multipart screen baskets 2030 arranged one behind another in the direction of the screw shaft axis L, which form a supporting frame for screen basket inserts 2033 insertable into the screen baskets 2030. The screen baskets 2030 are here formed of respectively two screen basket half shells 2031, wherein a first screen basket half shell 2031 is represented open and, correspondingly, the screen basket insert 2033 is discernible. The screen baskets 2030 or the screen basket half shells 2031 respectively have a basket length 1, running in the direction of the screw shaft 202. In the embodiment depicted in FIG. 1a, five screen baskets 2030 are present.

The screen jacket 203 fully encloses the screw shaft helix 2021 with a small clearance, so that a necessary pressure can be applied by the screw shaft 202 to the digestate suspension within the screen jacket 203 and a dewatering of the digestate suspension is possible in practice. The screen basket inserts 2033 are thin metal plates with continuous, evenly distributed screen holes having constant diameters from 2 millimeters up to about 6 millimeters. As a result of the small clearance and the thus small distance between the screen basket inserts 2033 and the screw shaft 202, the screen basket inserts 2033 are cleansed during the operation by after-flowing digestate suspension.

A multipart special screen jacket holding device 204, to which the screen baskets 2030 or the screen jacket 203 are fastened, is provided running within the press chamber 20.

In FIG. 1b, it is represented by arrows how the digestate suspension is fed through the screw press 2. In a first step, the digestate suspension is introduced into the screw press 2 through the press material infeed 24. The digestate suspension stems, for instance, from a fermenter of a biogas plant, and has a predominant liquid component mixed with solid digestate.

Following on from the press material infeed 24 is a preliminary dewatering screen 205, through which press water can escape directly after the feed-in. The digestate suspension is thereupon conveyed through the press chamber 20 by means of the screw shaft 202. By the driven screw shaft 202 or the screw shaft helix 2021, the digestate suspension is conveyed in the arrow direction parallel to the screw shaft axis L through a screen jacket interior 2034 which lies between the screw shaft helix 2021 and the inner face of the screen jacket 203. The screen basket inserts 2033 of the screen jacket 203 allow liquid filtrate to be pressed out of the digestate suspension transversely to the screw shaft axis L, which filtrate is discharged into a filtrate space 201 situated between the screen jacket 203 and the cover hood 22 or drain pan 21. The filtrate or press water escapes from the screen jacket 203 in the radial direction, while the dewatered digestate is transported as a pressed cake further in the direction of the continuous arrow in the direction of the pressing head 25.

Since the screw press 2 is arranged oriented at an angle α>0°, preferredly around 30°, to the horizontal H, press water flows automatically in the direction of the filtrate outlet 26, as indicated by the dashed arrow. No further technical measures have to be taken to convey the press water out of the press chamber 20.

In order to further dewater the pressed cake also at the point of ejection, the pressing head 25 is here of conical design, so that a taper must first be traversed before the pressed cake is ejected from the press material outfeed 250. The compression, dewatering and ejection are enabled by the screw helix 202.

In the sectional view according to FIG. 2, the multipart screen jacket holding device 204 is discernible, which runs in the filtrate space 201 of the press chamber 20. The multipart cover hood 22 and the drain pan 21 are shown schematically in dashed representation. The sectional view represents a cross section through the screw press 2, wherein the direction of view runs in the direction of the screw shaft 202 or of the screw shaft axis L. During operation, press water is pressed in the direction of the dashed arrows radially away from the screw shaft 202.

The screen jacket holding device 204 comprises a beam 2040 and two basket suspension beams 2041, 2041', which are arranged running parallel to the screw shaft axis L. These beams are all disposed outside the screen jacket. In the depicted embodiment, the beam 2040 is arranged vertically beneath the screw shaft 202, while the two basket suspension beams 2041, 2041' run above the screw shaft and slightly to the side. Between the two basket suspension beams 2041, 2041', brackets 2042 are oriented transversely to the screw shaft 202, i.e. perpendicular to the screw shaft axis L. To this screen jacket holding device 204, the screen baskets 2030 are fastened such that they run along the screw shaft 202.

The first screen basket half shell 2031 is provided as a supporting device with a screen basket insert 2033 and surrounds the screw shaft 202 at a concentric distance apart on one side of the screw shaft 202. A second screen basket half shell 2032 is provided with a screen basket insert 2033 and surrounds the screw shaft 202 concentrically on the opposite side of the screw shaft 202. The two screen basket half shells 2032, 2033 form a cylindrical screen basket 2030 with a screen jacket interior 2034. The screw shaft 202 traverses this screen jacket interior 2034, wherein the screw shaft helix 2021 is fastened minimally distanced from the screen basket inserts 2033.

The first screen basket half shell 2031 and the second screen basket half shell 2032 are fastened such that they are pivotably movable relative to each other. The pivotal mobility is achieved by the arrangement of at least one pivot hinge 2043 between the first and second screen basket half shell 2031, 2032. The pivot hinge 2043 is disposed on the centric beam 2040 and is respectively fixedly connected to both screen basket half shells 2031, 2032. In order that the screen basket 2030 is closed, basket closing means 2044, which hold together the first and the second screen basket half shell 2031, 2032 on the bracket 2042, are provided.

FIG. 3 shows a partially opened screen basket 2030. The first screen basket half shell 2031 is swung away from the screw shaft 202 by means of the pivot hinge 2043. In the opened state of the screen basket 2030, the screen basket insert 2033 of the first screen basket half shell 2031 is easily accessible and can be easily exchanged.

Both screen basket half shells 2031, 2032 are provided with flanges F, which run along the basket length 1 of the semicylindrical screen basket half shells 2031, 2032. In order to optimize the seal between the screen basket half shells 2031, 2032, the screen basket inserts 2033 are also respectively run around the flanges F.

One flange side of each screen basket half shell 2031, 2032, or the flange F itself, is connected to the at least one pivot hinge 2043. As a result of the connection of the flanges F to the pivot hinge 2043, the screen basket half shells 2031, 2032, when pivoted, are swung remotely away from the screw shaft 202, so that no unwanted contact with the screw shaft 202 can occur. In a preferred embodiment, two pivot hinges 2043 per screen basket 2030 are connected, and correspondingly two pivot hinges 2043 are arranged on each flange F.

On that side of the screen basket half shell 2031, 2032 which is facing away from the pivot hinge 2043 is respectively arranged a basket lug S. The basket lug S has a through hole. In the closed state of the two screen basket half shells 2031, 2032, the basket lug S of each screen basket half shell 2031, 2032 is fastened with the basket closing means 2044 to the bracket 2042 of the screen jacket holding device 204. It is thereby ensured that the screen jacket 203 and the screw shaft 202 remain concentrically arranged also during operation. In the closed state of the screen basket 2030, both semicylindrical screen basket half shells 2031, 2032 are fully closed along the basket length l in the region of the at least one pivot hinge 2043 and in the region of the bracket 2042.

As the basket closing means 2044, nuts and bolts, with which the basket lug S is fastenable to the bracket 2042, can be used. In this case, through holes are likewise arranged in the bracket 2042. For the fastening, the nuts and bolts can be tightly screwed, traversing the basket lug S and the bracket 2042. As the basket closing means 2044, other means which allow a releasable connection can also be used.

In FIG. 4, also the second screen basket half shell 2032 is pivoted by means of the arrangement on the pivot hinge 2043, whereby a maximum opening of the screen basket 2030 is easily achievable. The screen basket inserts 2033 of both screen basket half shells 2032 can be exchanged without difficulty. This exchange can be performed past the screw shaft 202. The screen basket inserts 2033 in the form of perforated plates are adapted by prior bending to the semicylindrical shape of the screen basket half shells 2032 and are inserted into the screen basket half shells 2031, 2032 and fixed there.

A maintenance of the screw press 2, in which screen basket inserts 2033 are changed, is realized according to the following maintenance process. Firstly, the screw press 2 is emptied as completely as possible, in that no further digestate suspension is fed and the digestate suspension which is present is compressed by means of the screw shaft 202, dewatered and discharged.

After this, the press chamber 20 is opened, in that the cover hood 22 is at least partially removed, whereby access to the filtrate space 201 is achieved. By release or removal of the basket closing means 2044 on the brackets 2042 between the basket suspension beams 2041, 2041', each individual screen basket 2030 can be easily opened by pivoting of the first screen basket half shell 2031 and pivoting of the second screen basket half shell 2032, whereby access is gained to the respective screen inserts 2033.

There follows a removal of the existing worn screen basket inserts 2033 and the insertion of new screen basket inserts 2033.

Following subsequent pivoting and bolting of the screen basket half shells 2031, 2032, the screw press 2 is prepared for future press runs and, following closure of the press chamber 20 by means of the cover hood 22, can be directly started up again.

According to the maintenance process according to the invention, the screen basket half shells 2031, 2032 remain in the press space 20 and only the screen basket inserts 2033 have to be exchanged. Removal and fitting of the screw shaft 202 can be dispensed with.

REFERENCE SYMBOL LIST 2 screw press
20 press chamber
   201 filtrate space (between screen jacket and cover hood or drain pan)
   202 screw shaft
      2021 screw shaft helix
   203 screen jacket (closed-off housing, protection from injury)
      2030 screen basket (multipart, forms with insert two hollow cylinders, pivotable in relation to each other)
      2031 first screen basket half shell
      2032 second screen basket half shell
      2033 screen basket insert
      2034 screen jacket interior
      l basket length
   204 screen jacket holding device
      2040 centric beam
      2041 basket suspension beam
      2042 bracket
      2043 pivot hinge
      2044 basket closing means
   205 preliminary dewatering screen
21 drain pan
22 cover hood (multipart/removable)
23 press supporting device
24 press material infeed
25 pressing head
   250 press material outfeed
26 filtrate outlet
27 motor
28 slip-on gear mechanism
29 hydraulic power unit (integrated)
10 press support
L screw shaft axes
S basket lug
H horizontal

The invention claimed is:

1. A screw press that is usable as a dewatering device for compressing and dewatering a suspension, the screw press comprising:

a press chamber in which a screw shaft is mounted such that the screw shaft is surrounded by a screen jacket and is rotatable about a screw shaft axis, the screen jacket being fastened to a screen jacket holding device within the press chamber, the screen jacket holding device including at least one beam running through the press chamber and arranged parallel to the screw shaft axis, the screen jacket being formed of a plurality of multipart screen baskets configured to receive a plurality of screen basket inserts, each multipart screen basket of the plurality of multipart screen baskets including a semi-cylindrical first screen basket half shell and a semi-cylindrical second screen basket half shell, the first screen basket half shell and the second screen basket half shell each having a flange running along a basket length of the first screen basket half shell and the second screen basket half shell;

at least one pivot hinge disposed between the first screen basket half shell and the second screen basket half shell, the at least one pivot hinge being disposed between the at least one beam and the plurality of multipart screen baskets, the at least one pivot hinge connecting the at least one beam to the first screen basket half shell and the second screen basket half shell via the respective flanges of the first screen basket half shell and the second screen basket half shell such that the first screen basket half shell and the second screen basket half shell are pivotably movable relative to each other and, in a swung-open state, unimpeded access to the plurality of screen basket inserts is enabled; and a basket lug disposed on each of the first screen basket half shell and the second screen basket half shell on a side of the first screen basket half shell and the second screen basket half shell facing away from the at least one pivot hinge, the basket lug being releasably fastened to a bracket of the screen jacket holding device by a bolt in a closed state of the first screen basket half shell and the second screen basket half shell.

2. The screw press as claimed in claim 1, wherein the screw press includes two pivot hinges disposed on each multipart screen basket of the plurality of multipart screen baskets.

3. The screw press as claimed in claim 1, wherein the basket lug has a through hole traversing the basket lug and the bracket of the screen jacket holding device has a through hole, and the through hole of the basket lug and the through hole of the bracket are configured to guide the bolt so as to close the screen basket along the basket length of the first screen basket half shell and the second screen basket half shell.

4. The screw press as claimed in claim 3, wherein the bolt is configured to be locked with a nut.

5. The screw press as claimed in claim 1, wherein the screen jacket holding device includes at least one basket suspension beam extending from the bracket and parallel to the screw shaft.

6. The screw press as claimed in claim 1, wherein the screen jacket holding device further includes two basket suspension beams, the at least one beam and the two basket suspension beams extending parallel to the screw shaft axis, the bracket being disposed between the two basket suspension beams and extending transversely with respect to the screw shaft.

7. A biogas plant comprising the screw press according to claim 1.

8. A maintenance process for changing the plurality of screen basket inserts from the plurality of multipart screen baskets in the press chamber of the screw press according to claim 1, the maintenance process comprising:

a) opening the press chamber by at least partially removing a cover hood;
b) removing the bolt between the screen jacket holding device and the first screen basket half shell;
c) pivoting the first screen basket half shell around the at least one pivot hinge fixed to the first screen basket half shell with the first screen basket half shell remaining in the press chamber;
d) removing a worn screen basket insert of the plurality of screen basket inserts from within a corresponding multipart screen basket of the plurality of multipart screen baskets, and inserting a new screen basket insert within the corresponding multipart screen basket of the plurality of multipart screen baskets;
e) repeating steps b) to d) all worn screen basket inserts of the plurality of screen basket inserts have been exchanged with new screen basket inserts;
f) closing the plurality of multipart screen baskets by pivoting the first screen basket half shell and inserting the bolt; and g) closing the cover hood.

* * * * *